United States Patent
Englund et al.

(10) Patent No.: US 8,286,526 B2
(45) Date of Patent: Oct. 16, 2012

(54) SYNCHRONIZER ACTUATING SYSTEM

(75) Inventors: Fredrik Englund, Trollhattan (SE);
Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1014 days.

(21) Appl. No.: 12/048,998

(22) Filed: Mar. 14, 2008

(65) Prior Publication Data

US 2008/0236315 A1  Oct. 2, 2008

Related U.S. Application Data

(60) Provisional application No. 60/909,293, filed on Mar. 30, 2007.

(51) Int. Cl.
*F16H 63/32* (2006.01)
(52) U.S. Cl. .................................. 74/473.37
(58) Field of Classification Search ............ 74/473.11, 74/473.36, 473.37; 92/88, 138
See application file for complete search history.

(56) References Cited

U.S. PATENT DOCUMENTS

| 2,157,328 | A * | 5/1939 | Durham | 91/403 |
| 4,445,393 | A * | 5/1984 | Braun | 74/346 |
| 6,038,938 | A * | 3/2000 | Szczepanski et al. | 74/473.24 |
| 6,619,153 | B2 * | 9/2003 | Smith et al. | 74/473.37 |
| 6,832,541 | B2 * | 12/2004 | Satou et al. | 92/88 |
| 7,367,918 | B2 * | 5/2008 | Muetzel et al. | 477/33 |
| 7,441,477 | B2 * | 10/2008 | Ho | 74/473.37 |
| 2003/0192762 | A1 * | 10/2003 | Peura | 192/36 |

FOREIGN PATENT DOCUMENTS

DE  10336969 A1  3/2005

\* cited by examiner

*Primary Examiner* — Thomas R Hannon
*Assistant Examiner* — Alan Waits

(57) ABSTRACT

A synchronizer actuating system for use in an automated manual transmission or a dual clutch transmission includes an apply finger and a fork mounted on a shifting rail. The fork grips and actuates a synchronizer sleeve. A piston is operable to engage and actuate the apply finger. The piston has an opening with a dual frusto-conical inner surface. The opening receives an extension of the apply finger therein. The dual frusto-conical inner surface allows the apply finger to be engaged by the piston at the center of the piston even if the apply finger or shifting rail is bent relative to the piston.

17 Claims, 4 Drawing Sheets

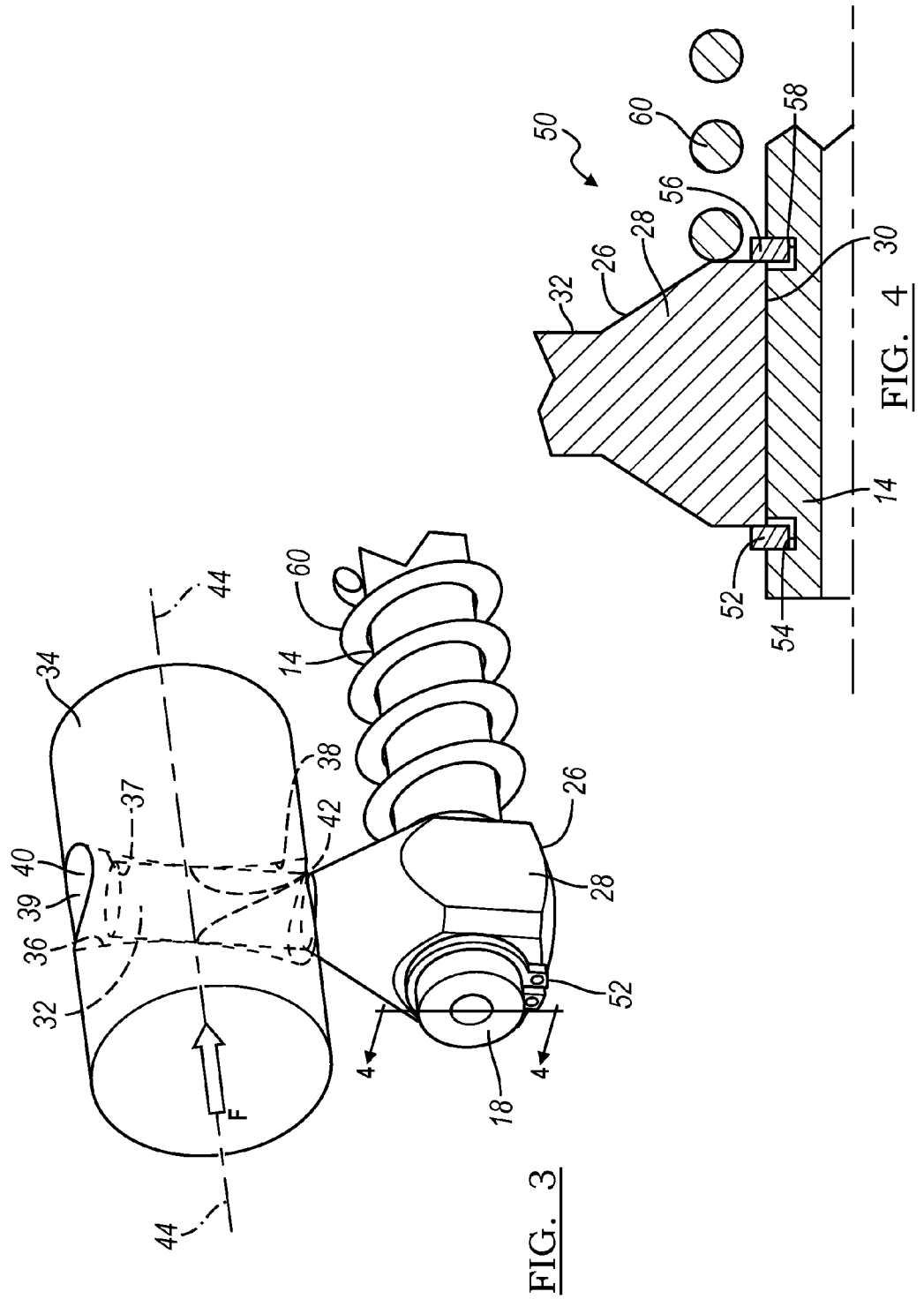

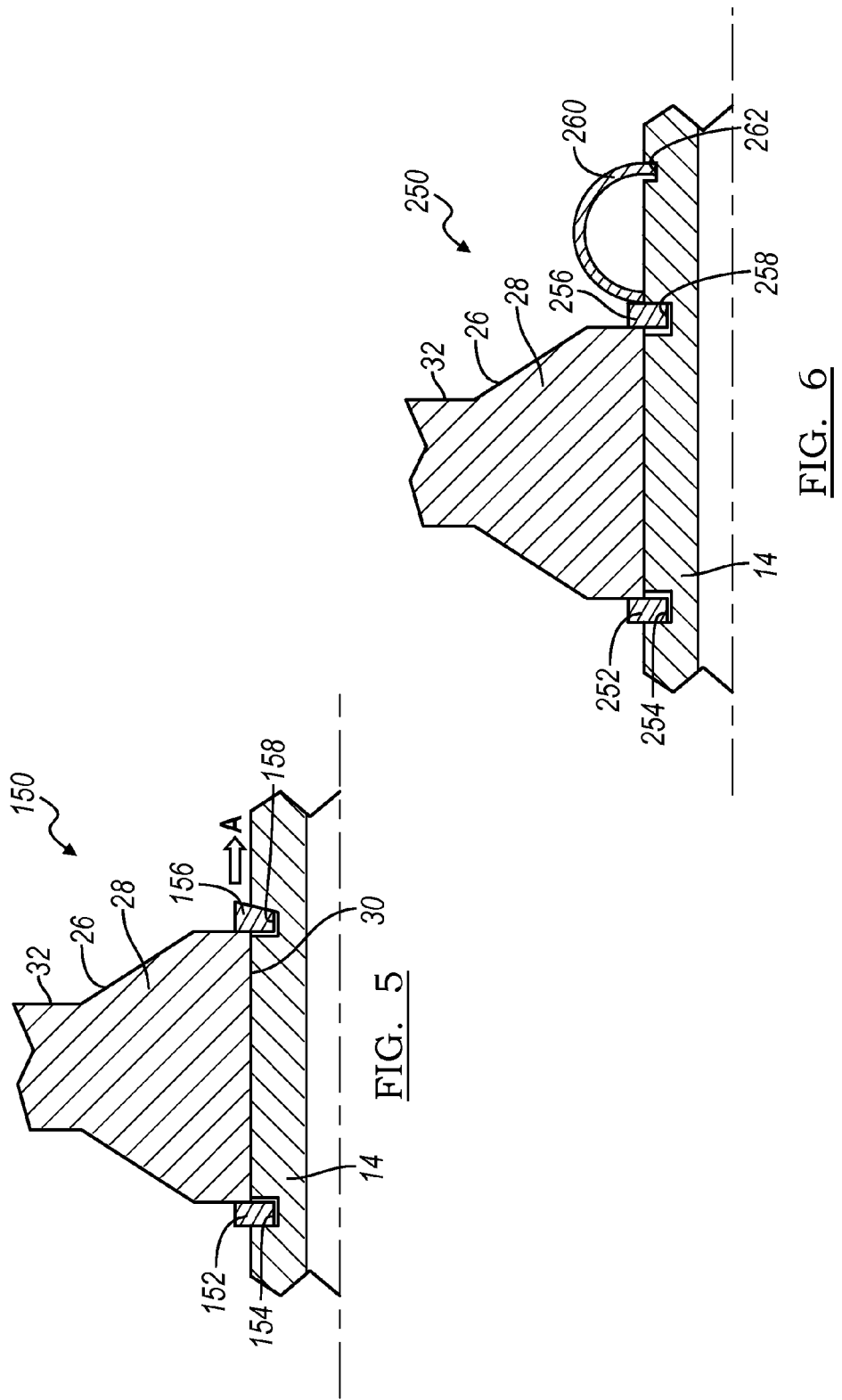

SYNCHRONIZER ACTUATING SYSTEM

CROSS-REFERENCE TO RELATED APPLICATIONS

This application claims the benefit of U.S. Provisional Application No. 60/909,293, filed on Mar. 30, 2007. The disclosure of the above application is incorporated herein by reference.

FIELD

The present disclosure relates to actuating systems, and more particularly to a synchronizer actuating system for a transmission.

BACKGROUND

The statements in this section merely provide background information related to the present disclosure and may or may not constitute prior art.

A typical manual transmission automated (MTA) or a dual clutch transmission (DCT) includes a plurality of gear sets that are selectively engaged by a plurality of torque transmitting devices, such as, for example, dog clutches or synchronizers. The synchronizers are preferably hydraulically or pneumatically actuated by an actuator. The actuator generally includes a fork connected to the synchronizer, a shifting rail connected to the fork, and a piston or other actuator that contacts and actuates a member extending from the shifting rail. While useful for its intended purpose, there is room in the art for an improved synchronizer actuating system that reduces mechanical wear and minimizes the effects of the piston tilting relative to the member and that includes features that allow for efficient assembly of the system.

SUMMARY

The present invention provides a synchronizer actuating system for use in a manual transmission automated or a dual clutch transmission.

In one aspect of the present invention the synchronizer actuating system includes an apply finger and a fork mounted on a shifting rail. The fork grips and actuates a synchronizer sleeve. A piston is operable to contact and actuate the apply finger. The piston has an opening with a dual frusto-conical inner surface. The opening receives an extension of the apply finger therein. The dual frusto-conical inner surface allows the apply finger to be engaged by the piston at the center of the piston even if the apply finger or shifting rail is out of alignment with the piston.

In another aspect of the present invention, the apply finger is secured from moving relative to the shifting element by a plurality of snap rings.

In another aspect of the present invention, the apply finger is secured from moving relative to the shifting element by a tapered snap ring on one side of the apply finger and by a regular snap ring on an opposite side of the apply finger.

In another aspect of the present invention, the apply finger is secured from moving relative to the shifting element by a clip.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is an enlarged, isometric view of a portion of the synchronizer actuating system;

FIG. 4 is an enlarged cross-sectional view of a first embodiment of a pre-load feature of the present invention taken in the direction of arrows 4-4 in FIG. 3;

FIG. 5 is an enlarged cross-sectional view of a second embodiment of the pre-load feature of the synchronizer actuating system;

FIG. 6 is an enlarged cross-sectional view of a third embodiment of the pre-load feature of the synchronizer actuating system.

DETAILED DESCRIPTION

The following description is merely exemplary in nature and is not intended to limit the present disclosure, application, or uses.

Figure 1:
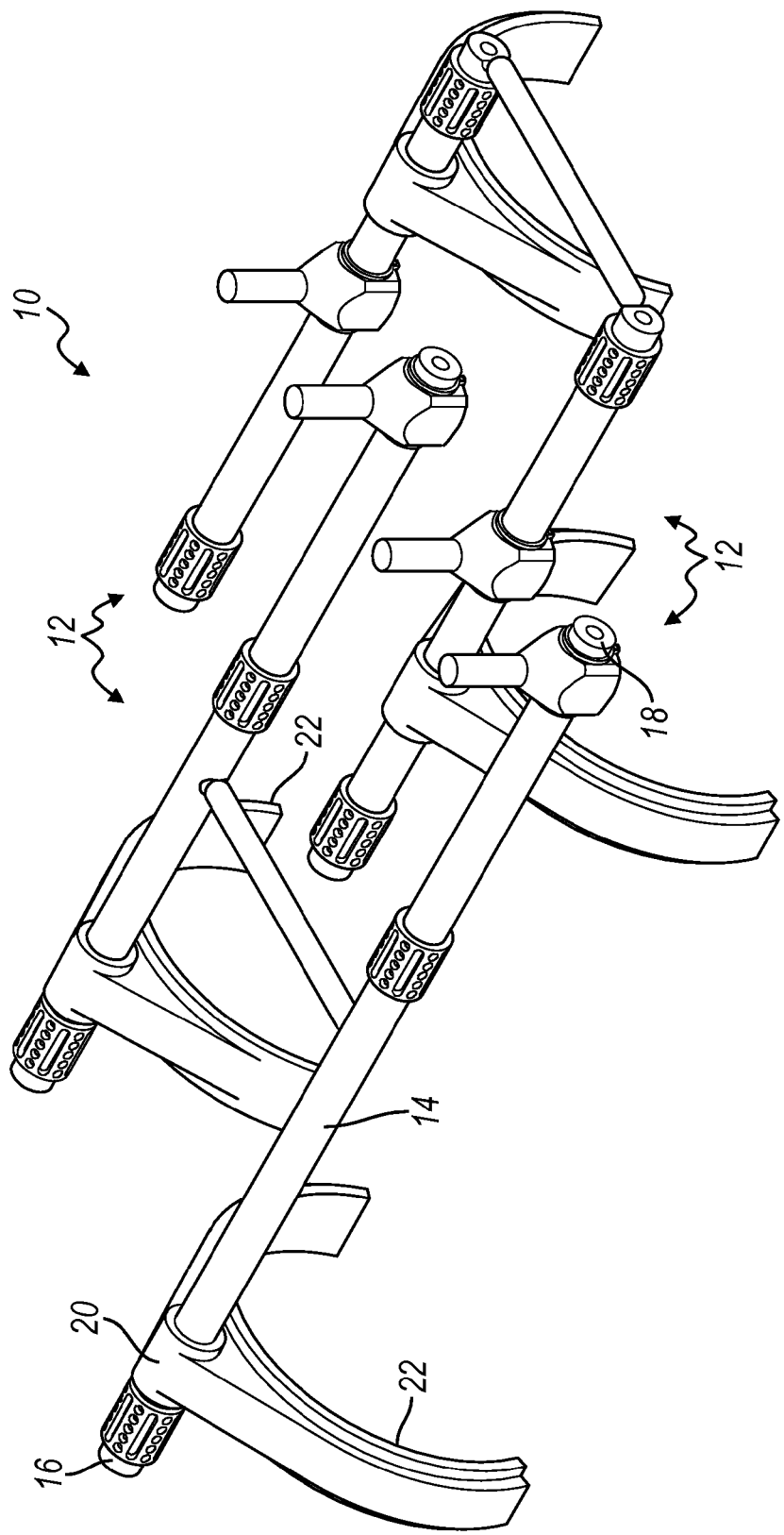
FIG. 1 is an isometric view of an exemplary synchronizer actuating system according to the principles of the present invention.
Figure 2:
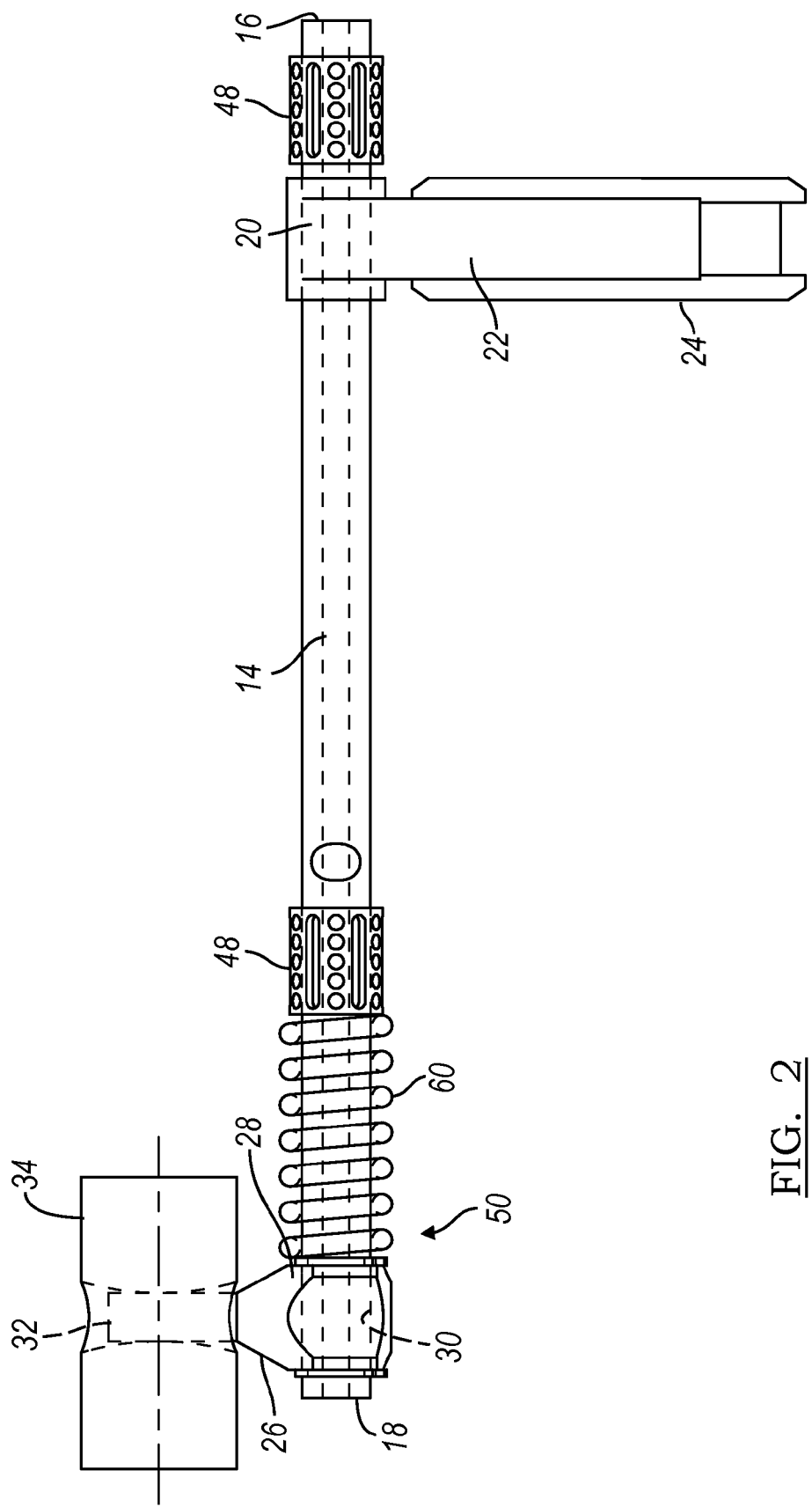
FIG. 2 is a side view of the synchronizer actuating system of the present invention.

With combined reference to FIGS. 1 and 2, a synchronizer actuating system is shown and generally indicated by reference number 10. The synchronizer actuating system 10 is configured to actuate a plurality of synchronizers (not shown) in an automated manual transmission or a dual clutch transmission. Actuation of the synchronizers by the synchronizer actuating system 10 allows the plurality of gears within the transmission to produce a plurality of forward and reverse gear ratios. The synchronizer actuating system 10 generally includes a plurality of synchronizer actuating elements 12. In the particular example provided, four synchronizer actuating elements 12 are illustrated, though it should be appreciated that any number of synchronizer actuating elements 12 may be employed without departing from the scope of the present invention. Each synchronizer actuating element 12 is substantially similar to another, accordingly, only one synchronizer actuating element 12 will be described in detail.

Each synchronizer actuating element 12 generally includes a cylindrical shifting rail 14. The shifting rail 14 is has a first end 16 opposite a second end 18. A fork 20 is mounted on the shifting rail 14 near the first end 16. The fork 20 includes a pair of extending fork arms 22. The fork arms 22 grip a synchronizer sleeve 24 (shown in FIG. 2). The synchronizer sleeve 24 is sized to receive a synchronizer (not shown) therein.

The synchronizer actuating element 12 further includes an apply finger 26 mounted on the shifting rail 14 near the second end 18. The apply finger 26 includes a base portion 28 that defines a mounting hole or bore 30. The mounting hole 30 is sized to receive the shifting rail 14 therein. Furthermore, a cylindrical extension 32 extends out from the base portion 28 of the apply finger 26.

The synchronizer actuating system 10 further includes a plurality of pistons 34 that engage the synchronizer actuating elements 12. Accordingly, the number of pistons 34 is equal to the number of synchronizer actuating elements 12. As each piston 34 is substantially similar to another, only one piston 34 will be described in detail. The piston 34 is preferably hydraulically or pneumatically activated. With reference to FIG. 3, the piston 34 defines a hole or bore 36. The hole 36 includes a dual frusto-conical inner surface 37 that defines a first conical portion 38 and a second conical portion 40. The conical portions 38 and 40 are aligned with one another such that the narrow ends of the conical portions 38 and 40 meet and define a neck or reduced diameter portion 42. Accordingly, the hole 36 has diameters on either side of the neck 42 that are larger than the diameter of the hole 36 at the neck 42. The neck 42 is located on longitudinal axis of the piston 34, indicated by reference number 44 in FIG. 3, at the center of the piston 34 within the hole 36.

The extension 32 of the apply finger 26 fits within the hole 36 of the piston 34. In order to change the gear ratio of the transmission that the synchronizer actuating system 10 is coupled to, the piston 34 is first actuated by a force, indicated by arrow "F" in FIG. 3. The force "F" is aligned with the axis 44 of the piston 34. As the piston 34 is moved, the piston 34 engages the extension 32 of the apply finger 26 and moves the apply finger 26 in a direction parallel to the axis 44. Axial movement of the apply finger 26 in turn moves the shifting rail 14, the fork 20, the synchronizer sleeve 24, and finally the synchronizer (not shown). Movement of the synchronizer allows for various gear combinations within the transmission.

The geometry of the hole 36 is such that when the force "F" is applied to the piston 34, the neck 42 first contacts the extension 32. However, in the event that the shifting rail 14 or the apply finger 26 is out of alignment with the piston 34, the geometry of the hole 36 is such that the neck 22 remains the first contact point between the piston 34 and the extension 32 of the apply finger 26. Accordingly, the neck 42 remains the first contact point without regard to the distance between the centerline of the shifting rail 14 and the centerline of the piston 34. By keeping the contact point located along the axis 44 of the piston 34, mechanical wear and piston tilting on the piston 34 is minimized.

The synchronizer actuating element 12 includes a plurality of linear bearings or bushings 48 mounted on the shifting rail 14. The linear bearings 48 support the synchronizer actuating element 12 within the transmission.

Turning now to FIG. 4, the synchronizer actuating element 12 further includes a pre-loading feature generally indicated by reference number 50. The pre-loading feature 50 includes a first snap ring 52 disposed within a first groove 54 located in the shifting rail 14 and a second snap ring 56 disposed within a second groove 58 located in the shifting rail 14. The snap rings 52, 56 are sized such that there is some clearance between the snap rings 52, 56 and the grooves 54, 58, as shown throughout the several views. The apply finger 26 is located between the first snap ring 52 and the second snap ring 56. The snap rings 52 and 56 cooperate to restrict the axial movement of the apply finger 26 along the shifting rail 14. A biasing member 60 engages the apply finger 26 and urges the apply finger 26 against the first snap ring 52. In the particular example provided, the biasing member 60 is a spring that extends between the apply finger 26 and the bushing 48. The pre-loading feature 50 prevents the apply finger 26 from rotating about the shift rail 14 during assembly of the synchronizer actuating system 10.

With reference to FIG. 5, a second embodiment of the pre-loading feature is indicated by reference number 150. The pre-loading feature 150 includes a first snap ring 152 disposed within a first groove 154 located in the shift rail 14. A first tapered snap ring 156 is disposed within a second groove 158 located in the shift rail 14. The apply finger 26 is located between the first snap ring 152 and the tapered snap ring 156. The first snap ring 152 and the tapered snap ring 156 cooperate to restrict the axial movement of the apply finger 26 along the shifting rail 14. The tapered snap ring 156 has a generally trapezoidal cross-section and is positioned such that it engages the apply finger 26 to urge the apply finger 26 against the first snap ring 152. More specifically, in the present embodiment the tapered snap ring 156 has two parallel sides, one side perpendicular to both parallel sides, and an angled side. However, the tapered snap ring 156 may have other shapes without departing from the scope of the present invention. The pre-loading feature 150 prevents the apply finger 26 from rotating about the shifting rail 14 during assembly of the synchronizer actuating system 10.

With reference to FIG. 6, a third embodiment of the pre-loading feature is indicated by reference number 250. The pre-loading feature 250 includes a first snap ring 252 disposed within a first groove 254 located in the shifting rail 14. A second snap ring 256 is disposed within a second groove 258 located in the shifting rail 14. The apply finger 26 is located between the first snap ring 252 and the second snap ring 256. The snap rings 252 and 256 cooperate to restrict the axial movement of the apply finger 26 along the shifting rail 14. A clip or spring 260 is disposed within a third groove 262 located in the shifting rail 14. The third groove 262 may be located on either side of the apply finger 26. The clip 260 contacts the first snap ring 252 and urges the first snap ring 252 against the apply finger 26. The pre-loading feature 250 prevents the apply finger 26 from rotating about the shifting rail 14 during assembly of the synchronizer actuating system 10.

The description of the invention is merely exemplary in nature and variations that do not depart from the gist of the invention are intended to be within the scope of the invention. Such variations are not to be regarded as a departure from the spirit and scope of the invention.

We claim the following:

1. An assembly for actuating a synchronizer in a transmission, the assembly comprising:
    a piston moveable along a longitudinal axis, the piston having a bore, the bore having a reduced diameter portion centered on the longitudinal axis;
    a shift fork connected to the synchronizer;
    a shift rail having a first and a second circumferential groove, and a first end and a second end opposite the first end, wherein the shift rail is connected to the shift fork proximate the first end and is operable to move the shift fork between at least two positions, and the circumferential grooves are disposed more proximate the second end than the first end;
    an apply finger supported by the shift rail proximate the second end, the apply finger extending perpendicular from the shift rail and having an extension that is disposed within the bore of the piston, and
    wherein when the piston is moved along the longitudinal axis, the reduced diameter portion of the bore contacts the extension of the apply finger and moves the apply finger and the shift rail in a direction parallel to the longitudinal axis in order to actuate the synchronizer.

2. The assembly of claim 1 wherein the bore has a frusto-conical shape on each side of the reduced diameter portion.

3. The assembly of claim 1 further comprising a bushing supporting the shift rail within the transmission, and a biasing member located between the bushing and the apply finger, wherein the biasing member biases the apply finger away from the bushing.

4. The assembly of claim 3 further comprising a first snap ring disposed in the first circumferential groove located in the shift rail proximate the apply finger, and wherein the biasing member biases the apply finger against the first snap ring.

5. The assembly of claim 4 further comprising a second snap ring disposed in the second circumferential groove located in the shift rail proximate the apply finger, and wherein the apply finger is located between the first snap ring and the second snap ring.

6. The assembly of claim 1 further comprising a first snap ring disposed in the first circumferential groove and a tapered snap ring disposed in the second circumferential groove, and wherein the apply finger is located between the first snap ring and the tapered snap ring, and wherein the tapered snap ring biases the apply finger against the first snap ring.

7. The assembly of claim 1 further comprising a first snap ring disposed in the first circumferential groove, a second snap ring disposed in the second circumferential groove, and a biasing member disposed in a third circumferential groove located in the shift rail, wherein the apply finger is located between the first snap ring and the second snap ring, and wherein the biasing member biases the at least one of the first snap ring and the second snap rink against the apply finger.

8. The assembly of claim 7 wherein the biasing member is a spring having a base portion located in the third circumferential groove.

9. An assembly for actuating a synchronizer in a transmission, the assembly comprising:
 a piston moveable along a longitudinal axis, the piston having an inner surface that defines a bore and an opening that communicates with the bore, wherein the inner surface at a first portion has a first diameter and the inner surface at a second portion has a second diameter, and wherein the first diameter is greater than the second diameter;
 a shift rail having a first and a second circumferential groove, and a first end and a second end opposite the first end, the shift rail connected to the synchronizer and operable to move the synchronizer between at least two positions, and the circumferential grooves are disposed more proximate the second end than the first end;
 an apply finger connected to the shift rail, the apply finger having an extension that is disposed within the bore of the piston, and
 a bushing supporting the shift rail within the transmission, and a biasing member located between the bushing and the apply finger, wherein the biasing member biases the apply finger away from the bushing, and
 wherein when the piston is moved along the longitudinal axis, the second portion of the inner surface contacts the extension of the apply finger and moves the apply finger and the shift rail in a direction parallel to the longitudinal axis in order to actuate the synchronizer.

10. The assembly of claim 9 wherein the first portion is located near the opening and the second portion is located proximate the longitudinal axis.

11. The assembly of claim 9 wherein the inner surface included a third portion having a third diameter greater than the second diameter, wherein the second portion is located between the first portion and the third portion.

12. The assembly of claim 9 wherein the bore has a frusto-conical shape on each side of the second portion.

13. The assembly of claim 9 further comprising a first snap ring disposed in the first circumferential groove located in the shift rail proximate the apply finger, and wherein the biasing member biases the apply finger against the first snap ring.

14. The assembly of claim 13 further comprising a second snap ring disposed in the second circumferential groove located in the shift rail proximate the apply finger, and wherein the apply finger is located between the first snap ring and the second snap ring.

15. The assembly of claim 9 further cmprising a first snap ring disposed in the first circumferential groove and a tapered snap ring disposed in the second circumferential groove, and wherein the apply finger is located between the first snap ring and the tapered snap ring, and wherein the tapered snap ring biases the apply finger against the first snap ring.

16. The assembly of claim 9 further comprising a first snap ring disposed in the first circumferential groove a second snap ring disposed in the second circumferential groove, and a biasing member disposed in a third circumferential groove located in the shift rail, wherein the apply finger is located between the first snap ring and the second snap ring, and wherein the biasing member biases at least one of the first snap ring and the second snap ring against the apply finger.

17. The assembly of claim 16 wherein the biasing member is a spring having a base portion located in the third circumferential groove.

* * * * *